(12) United States Patent
Sugawara et al.

(10) Patent No.: US 8,738,006 B2
(45) Date of Patent: May 27, 2014

(54) MOBILE TERMINAL AND COMMUNICATION CONTROL METHOD

(75) Inventors: Yoji Sugawara, Kawasaki (JP); Takashi Satou, Kawasaki (JP); Natsuhiko Nakayauchi, Kawasaki (JP); Tetsuya Oki, Kawasaki (JP); Makoto Kurimoto, Kawasaki (JP); Yuji Hosokawa, Kawasaki (JP); Shinsuke Okazoe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 12/975,672

(22) Filed: Dec. 22, 2010

(65) Prior Publication Data

US 2011/0159879 A1 Jun. 30, 2011

(30) Foreign Application Priority Data

Dec. 28, 2009 (JP) ................. 2009-297657

(51) Int. Cl.
*H04Q 7/20* (2006.01)

(52) U.S. Cl.
USPC ............ 455/441; 455/422.1; 455/426.1; 455/63.2; 455/450; 455/452.1; 370/342; 375/344

(58) Field of Classification Search
None
See application file for complete search history.

(56) References Cited

U.S. PATENT DOCUMENTS

| | | | |
|---|---|---|---|
| 7,020,180 B2 | 3/2006 | Challa et al. | |
| 7,089,004 B2 | 8/2006 | Jeong et al. | |
| 7,286,801 B2 | 10/2007 | Amerga et al. | |
| 7,340,017 B1 | 3/2008 | Banerjee | |
| 2002/0081989 A1* | 6/2002 | Boloorian | 455/313 |
| 2003/0067898 A1 | 4/2003 | Challa et al. | |
| 2004/0023634 A1* | 2/2004 | Jeong et al. | 455/403 |
| 2004/0176148 A1 | 9/2004 | Morimoto | |
| 2005/0272425 A1* | 12/2005 | Amerga et al. | 455/436 |
| 2009/0034449 A1* | 2/2009 | Kong et al. | 370/320 |

FOREIGN PATENT DOCUMENTS

| | | |
|---|---|---|
| JP | 2003-23671 | 1/2003 |
| JP | 2004-247958 | 9/2004 |
| JP | 2006-115206 | 4/2006 |
| WO | 03/030391 | 4/2003 |
| WO | 2005/115042 | 12/2005 |

OTHER PUBLICATIONS

European Search Report dated Mar. 3, 2011, from corresponding European Application No. 10196828.7.
Notification of Reasons for Refusal dated Sep. 3, 2013, from corresponding Japanese Application No. 2009-297657.

* cited by examiner

*Primary Examiner* — Charles Appiah
*Assistant Examiner* — Randy Peaches
(74) *Attorney, Agent, or Firm* — Katten Muchin Roseman LLP (57) ABSTRACT

A mobile terminal communicating with a plurality of cells, including a serving cell, has a control unit. The control unit performs at least one control of (a) a first control for causing a path search unit to detect a path for the serving cell more preferentially than paths for cells other than the serving cell, (b) a second control for causing a finger assignment unit to assign a path detected for the serving cell preferentially over paths detected for cells other than the serving cell to a plurality of fingers, and
(c) a third control for causing a reference frequency adjustment unit to adjust reference frequency so that the reference frequency is approximated to reference frequency of a base station controlling the serving cell.

3 Claims, 5 Drawing Sheets

MOBILE TERMINAL AND COMMUNICATION CONTROL METHOD

CROSS-REFERENCE TO RELATED APPLICATIONS

This application is based upon and claims the benefit of priority of the prior Japanese Patent Application No. 2009-297657, filed on Dec. 28, 2009, the entire contents of which are incorporated herein by reference.

FIELD

The present invention relates to a technical field of a mobile terminal that transmits and receives signals to and from a base station and processes the received signals and a communication control method used in the mobile terminal. For example, the present invention relates to a technical field of a mobile terminal and a communication control method in a CDMA mobile communication system.

BACKGROUND

Conventionally, in the CDMA mobile communication system, a RAKE reception method is used in which signal quality is improved by separating delayed multiple waves arrived from one base station through a plurality of transmission paths having delay times different from each other and synthesizing a signal by adjusting the delay times. Hereinafter, the transmission path may be referred to as a path.

In the RAKE reception method, a signal, which is delayed multiple waves in which radio waves arrived through different paths are overlapped with each other, is inputted into each of a plurality of fingers that include a correlator, a reverse diffuser, and an integrator in a mobile terminal. The finger receives an input of a reverse diffusion code delayed according to timing of each wave, and separates a carrier wave transmitted through each path from the delayed multiple waves. Thereafter, signal quality is improved by adjusting the timings of the waves and synthesizing the waves at appropriate rates.

When a difference occurs between a frequency of a carrier wave from a base station performing communication and a reference frequency in a mobile terminal, such as when the mobile terminal moves at high-speed, a follow-up control of the reference frequency of the mobile terminal is performed on the basis of a Doppler frequency component of the carrier wave frequency of the base station by so-called AFC (Auto Frequency Control) processing.

Such a series of processing is appropriately performed, so that high throughput communication can be maintained between the base station and the mobile station.

By the way, in a mobile communication system of non-HSPA (High Speed Packet Access) method, a terminal may receive signal transmission by connecting with cells of a plurality of base stations at the same time. Also, in a mobile communication system of HSPA method, for example, at outer edge of a cell, which is an active cell, a mobile terminal is easily affected by communication radio wave from another cell, and the mobile terminal may communicate with a plurality of cells at the same time. Also, when a handover occurs frequently among a plurality of cells, such as when the mobile terminal moves at high-speed, there is a possibility that the mobile terminal is connected to a plurality of cells at the same time.

In a conventional mobile terminal, control is performed using a result obtained by performing RAKE processing on Doppler frequency fluctuation components of all active cells including an HSPA serving cell, and AFC processing is performed so that the reference frequency of the mobile terminal comes close to the centroid of the frequencies of the carrier waves from base stations controlling the active cells. In particular, in a mobile terminal communicating with a plurality of cells, stable AFC processing is realized for all active cells by controlling the reference frequency of the mobile terminal to approach the centroid obtained by combining Doppler frequency fluctuation components of all the active cells. Such a conventional technique is disclosed in Japanese Laid-open Patent Publication No. 2006-115206.

When a mobile terminal of HSPA method is in an environment moving at high speed, the mobile terminal does not necessarily perform optimal AFC control for the serving cell among a plurality of cells. Therefore, in HSDPA (High Speed Downlink Packet Access), a decrease of CQI (Channel Quality Indicator) and a deterioration of block error rate in DSCH (Downlink Shared Channel) occur, and this may result in low throughput.

This is the same in a path search for a serving cell and a finger assignment to the path of the serving cell in an environment in which a mobile terminal is connected to a plurality of cells. For example, in the path search, if the scheduling of the path search is performed equally for a plurality of active cells including a serving cell and non-serving cells, the schedule may not be an optimal schedule for the serving cell. When fingers are assigned to paths of the active cells, if the fingers are assigned to the paths in descending order of received power, sufficient finger function may not be assigned to the path of the serving cell.

As described above, in an environment in which a mobile terminal is connected to a plurality of cells at the same time, according to the mobile terminal and the communication control method used in the conventional mobile communication system, optimal communication may not be performed for the serving cell, and it may result in low reception quality and low throughput.

SUMMARY

According to an aspect of the invention, a mobile terminal communicating with a plurality of cells, including a serving cell, has a control unit. The control unit performs at least one control of (a) a first control for causing a path search unit to detect a path for the serving cell more preferentially than paths for cells other than the serving cell, (b) a second control for causing a finger assignment unit to assign a path detected for the serving cell preferentially over paths detected for cells other than the serving cell to a plurality of fingers, and (c) a third control for causing a reference frequency adjustment unit to adjust reference frequency so that the reference frequency is more approximated to reference frequency of a base station controlling the serving cell compared with a case in which reference frequency is approximated to reference frequencies of a plurality of base stations controlling a plurality of cells including the serving cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described with reference to the drawings.

(1) Basic Configuration Example

Figure 1:
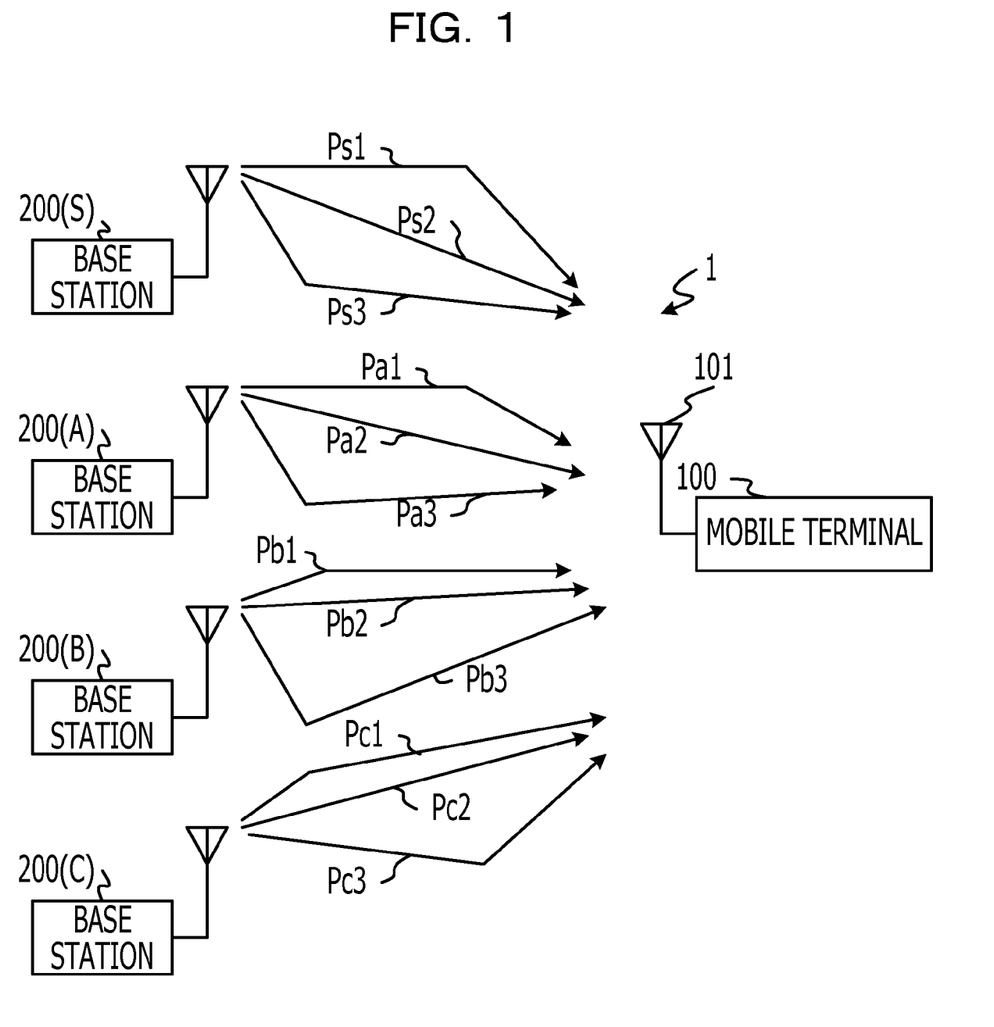
FIG. 1 is a schematic diagram showing a configuration of a mobile communication system including a plurality of base stations and a mobile terminal.

A mobile terminal according to the embodiment is connected to a plurality of base stations including a base station controlling a serving cell via a plurality of cells. FIG. 1 is a schematic diagram conceptually showing a configuration of a mobile communication system 1 including a mobile terminal 100 of, for example, W-CDMA (Wideband Code Division Multiple Access) method, which is a specific example of the mobile terminal according to the embodiment, and base stations 200(S), 200(A), 200(B), and 200(C).

As shown in FIG. 1, the mobile terminal 100 is connected to a cell of each of the base stations 200(S), 200(A), 200(B), and 200(C), and receives transmission of a digital signal including a pilot signal which is a known reference signal. In FIG. 1, the cell under control of the base station 200(S) functions as a serving cell S for the mobile terminal 100, and transmits both of Absolute Grant Channel (AGCH) and Relative Grant Channel (RGCH) to the mobile terminal 100. On the other hand, the cells under control of each base station 200(A), 200(B), and 200(C) function as non-serving cells, and transmit Relative Grant Channel (RGCH), but do not transmit Absolute Grant Channel (AGCH) to the mobile terminal 100. Hereinafter, the cells under control of each of the base stations 200(A), 200(B), and 200(C) are respectively referred to as cell A, cell B, and cell C.

The cells of each base station respectively transmit a digital signal to the mobile terminal 100 via multipath including a plurality of paths. In an example of FIG. 1, the serving cell S transmits a digital signal to the mobile terminal 100 via paths Ps1, Ps2, and Ps3, the cell A transmits a digital signal to the mobile terminal 100 via paths Pa1, Pa2, and Pa3, the cell B transmits a digital signal to the mobile terminal 100 via paths Pb1, Pb2, and Pb3, and the cell C transmits a digital signal to the mobile terminal 100 via paths Pc1, Pc2, and Pc3. In other words, a reception processing system in the mobile terminal 100 detects each of the paths Ps1, Ps2, and Ps3 of the serving cell S, the paths Pa1, Pa2, and Pa3 of the cell A, the paths Pb1, Pb2, and Pb3 of the cell B, and the paths Pc1, Pc2, and Pc3 of the cell C, and receives the digital signals.

In the mobile terminal 100, an antenna 101 included in the mobile terminal receives the digital signal and outputs the digital signal to the internal reception processing system. Here, the reception processing system inside the mobile terminal 100 will be described with reference to FIG. 2.

Figure 2:
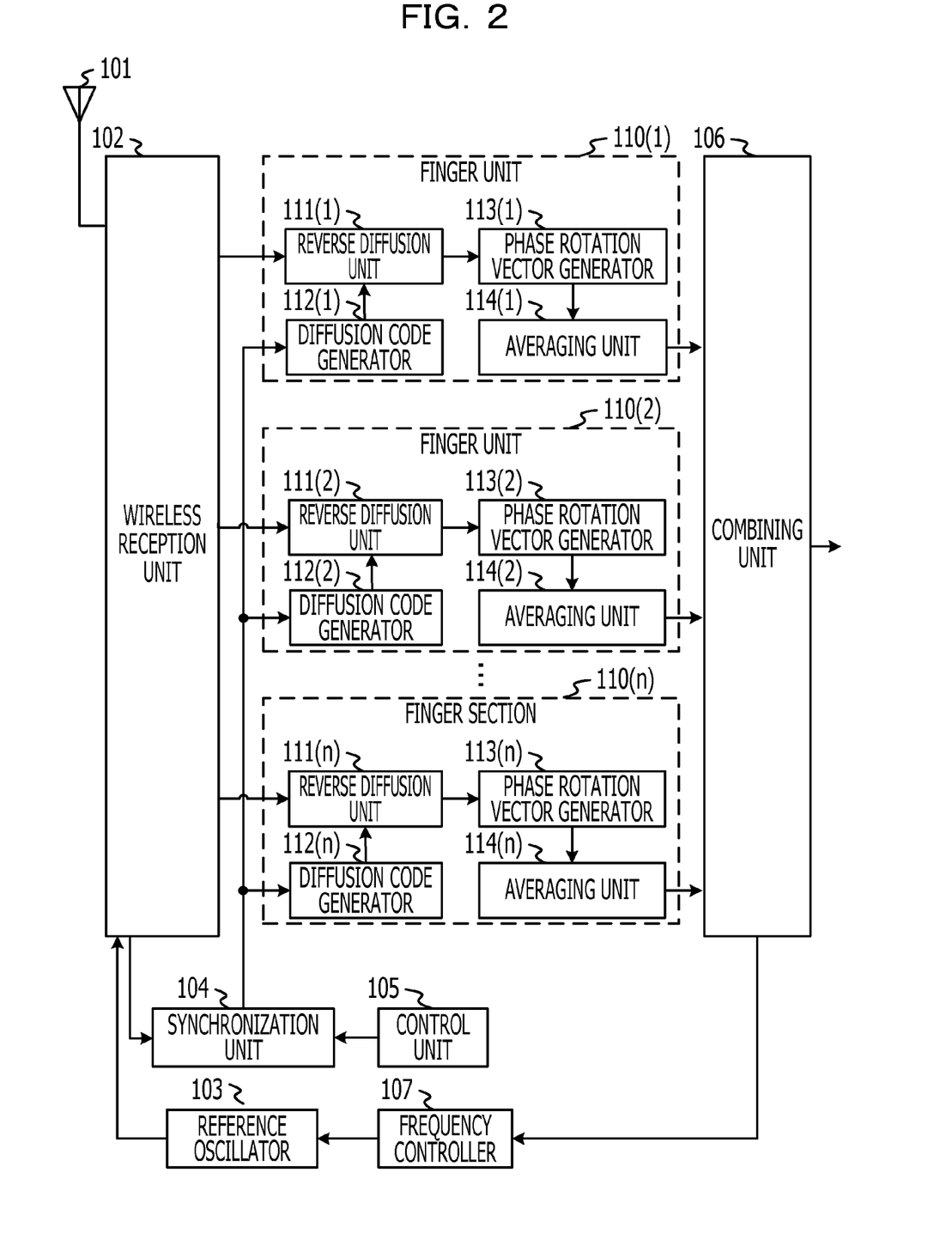
FIG. 2 is a block diagram showing a configuration example of a reception processing system of a mobile terminal in a CDMA mobile communication system.

FIG. 2 is a block diagram showing a configuration of the reception processing system inside the mobile terminal 100. As shown in FIG. 2, the mobile terminal 100 includes a wireless reception unit 102, a reference oscillator 103, a synchronization unit 104, a control unit 105, a combining unit 106, a frequency controller 107, and n finger units 110(1) to 110(n) each of which has the same configuration as the reception processing system.

The wireless reception unit 102 retrieves a baseband signal from the digital signal received by the antenna 101 on the basis of the reference frequency provided from the reference oscillator 103. The wireless reception unit 102 provides the retrieved baseband signal to the synchronization unit 104 and a cell search unit not shown in FIG. 2. The cell search unit performs a so-called cell search which is identification processing of the type and the timing of a diffusion code transmitted from each of a plurality of the base stations when a CDMA wireless reception device of the mobile terminal 100 is turned on.

The reference oscillator 103 is an oscillator with high frequency accuracy which can control vibration frequency by a provided voltage. For example, the reference oscillator 103 is VCTCXO (Voltage Controlled, Temperature Compensated Crystal Oscillator).

The synchronization unit 104 is a specific example of a path search unit and a finger assignment unit in the embodiment, and performs a so-called path search which is detection processing of a delayed wave generated by difference between paths between the base station and the mobile terminal 100 by performing correlation calculation from the base band signal on which a so-called path search processing and finger assignment processing are performed.

Specifically, the synchronization unit 104 performs a so-called path search processing for detecting a plurality of paths having different transmission times from the base station 200(S), 200(A), 200(B), and 200(S) to the mobile terminal 100 (specifically, the paths Ps1, Ps2, and Ps3 of the serving cell S, the paths Pa1, Pa2, and Pa3 of the cell A, the paths Pb1, Pb2, and Pb3 of the cell B, and the paths Pc1, Pc2, and Pc3 of the cell C) by detecting the timing of the pilot signal in the digital signal as a path search process. The synchronization unit 104 performs path detection for each of a plurality of cells of the serving cell S, the cell A, the cell B, and the cell C on the basis of a path search schedule. In particular, the synchronization unit 104 according to the embodiment sets a path search schedule so that the path search is performed preferentially for the serving cell under control of the control unit 105. A specific example of the path search schedule will be described below.

Further, the synchronization unit 104 determines the phase of the diffusion code from the timing of each detected path, and assigns a specified diffusion code to diffusion code generation units 112(1) to 112(n) of each finger unit 110(1) to 110(n) as a finger assignment process. At this time, the synchronization unit 104 determines diffusion codes to be notified to the diffusion code generation units 112(1) to 112(n) of each finger unit 110(1) to 110(n) on the basis of path search correlation power of each path. For example, the synchronization unit 104 assigns a diffusion code corresponding to each path in descending order of the detected path search correlation power. In particular, the synchronization unit 104 according to the embodiment performs processing for preferentially assigning the paths Ps1, Ps2, and Ps3 of the serving cell S to the finger units 110(1) to 110(n) under the control of the control unit 105. This processing will be described in detail below.

The finger units 110(1) to 110(n) include respectively reverse diffusion units 111(1) to 111(n), diffusion code generators 112(1) to 112(n), phase rotation vector generators 113(1) to 113(n), and averaging units 114(1) to 114(n).

The diffusion code generators 112(1) to 112(n) respectively generate a diffusion code according to the diffusion code specified by the synchronization unit 104, and provide the diffusion code to the reverse diffusion units 111(1) to 111(n) in the same finger unit. The reverse diffusion units 111(1) to 111(n) perform reverse diffusion processing on the plurality of paths detected by the synchronization unit 104 by using the diffusion code synchronized with the amount of delay of each path. The phase rotation vector generators 113(1) to 113(n) perform delayed wave detection processing on the digital signals on which the reverse diffusion processing is performed by the reverse diffusion units 111(1) to 111(n), and calculate phase rotation vectors indicating amounts of phase change per symbol. The averaging units 114(1) to 114(n) perform averaging processing of the phase rotation vectors generated by the phase rotation vector generators 113(1) to 113(n) in a specified period, and calculate phase rotation vector average values.

The combining unit 106 receives reception symbols of a plurality of paths outputted from a plurality of (n) finger units 110(1) to 110(n), and adjusts the timings thereof and combines them.

The combining unit 106 receives the average values of the phase rotation vectors calculated by the averaging units 114(1) to 114(n), combines phase rotation vector average values generated from digital signals having the same diffusion code, and calculates a phase rotation vector average value for each base station. Then, the combining unit 106 calculates a phase rotation vector combination value by combining vectors of the calculated phase rotation vector average values of each base station.

In particular, the combining unit 106 according to the embodiment weights the phase rotation vector average value of the base station controlling the serving cell among the phase rotation vector average values of each base station with a predetermined weight value, and then combines vectors of the weighted phase rotation vector average value and the phase rotation vector average values of the other base stations. This weighting processing will be described in detail below.

The frequency controller 107 receives the combined phase rotation vector average value, in other words, the phase rotation vector combination value from the combining unit 106, detects a frequency control amount, and provides a control voltage according to the frequency control amount to the reference oscillator 103. The reference oscillator 103 that receives the control voltage performs so-called AFC processing for adjusting the reference frequency of the mobile terminal 100 which is used for the wireless reception unit 102 to retrieve the base band signal from the digital signal by changing the frequency of the carrier wave on the basis of the control voltage.

Since the mobile terminal 100 receives digital signals from each of the plurality of base stations 200(S), 200(A), 200(B), and 200(C), for example, in conventional AFC processing, an operation to approximate the reference frequency to a so-called centroid of the frequencies of the carrier waves of each base station is performed. On the other hand, the frequency controller 107 according to the embodiment weights the reference frequency of the mobile terminal 100 so that the reference frequency comes closer to the frequency of the carrier wave of the serving cell S, and then generates a control voltage according to a phase rotation speed. The AFC processing will be described in detail below.

(2) Example of Path Search Control

Figure 3A:
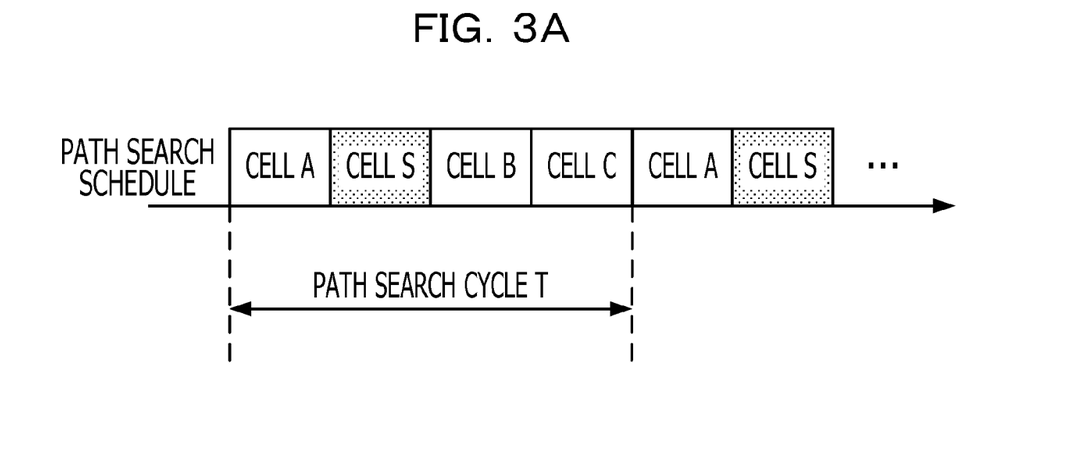
FIGS. 3A and 3B are time charts showing schedules of path searches performed in a mobile terminal according to an embodiment.
Figure 3B:
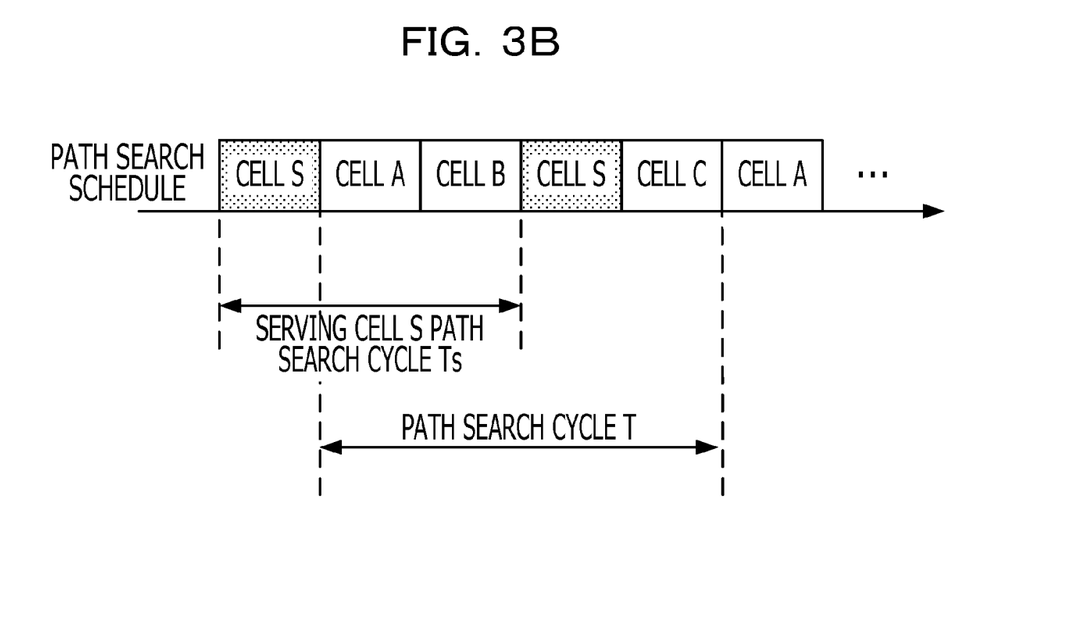

A path search operation performed by the synchronization unit 104 in the mobile terminal 100 will be described with reference to FIGS. 3A and 3B. FIGS. 3A and 3B are time charts showing a schedule for each cell of a path search performed by a mobile terminal which is connected to one serving cell S and a plurality of non-serving cells, cell A, cell B, and cell C in the same manner as the mobile terminal shown in FIG. 1. FIG. 3A is a time chart showing a schedule for each cell of a conventional path search, and FIG. 3B is a time chart showing a schedule for each cell of a path search performed by the synchronization unit 104 of the mobile terminal 100 according to the embodiment.

In a conventional path search schedule shown in FIG. 3A, the frequency of path search, in other words, the path search cycle is set to be the same for all the cells. In the example of FIG. 3A, the path search is performed once for each of the cell A, the serving cell, the cell B, and the cell C in this order. Therefore, the path search cycle for the serving cell S is a path search cycle T which is a sum of the path search times for all continuous cells.

On the other hand, the synchronization unit 104 according to the embodiment performs processing for assigning a path search schedule preferentially to the serving cell S. For example, the synchronization unit 104 switches path search schedules so that path search for the serving cell S is preferentially performed and path search for non-serving cells, cell A, cell B, and cell C is performed in the path search cycle T that is the same as that of the conventional path search. Therefore, as shown in FIG. 3B, the path search cycle Ts for the serving cell S can be shorter than the path search cycle T for all the cells.

When the mobile terminal 100 is moving, the synchronization unit 104 may determine the path search cycle Ts of the serving cell S according to the moving speed of the mobile terminal 100. In this case, specifically, the faster the moving speed of the mobile terminal 100 is, the shorter the path search cycle Ts of the serving cell S is set.

Therefore, even when the mobile terminal 100 is moving fast, it is possible to more preferably improve tracking accuracy of the path to the serving cell S.

(3) Example of Finger Assignment Control

Figure 4A:
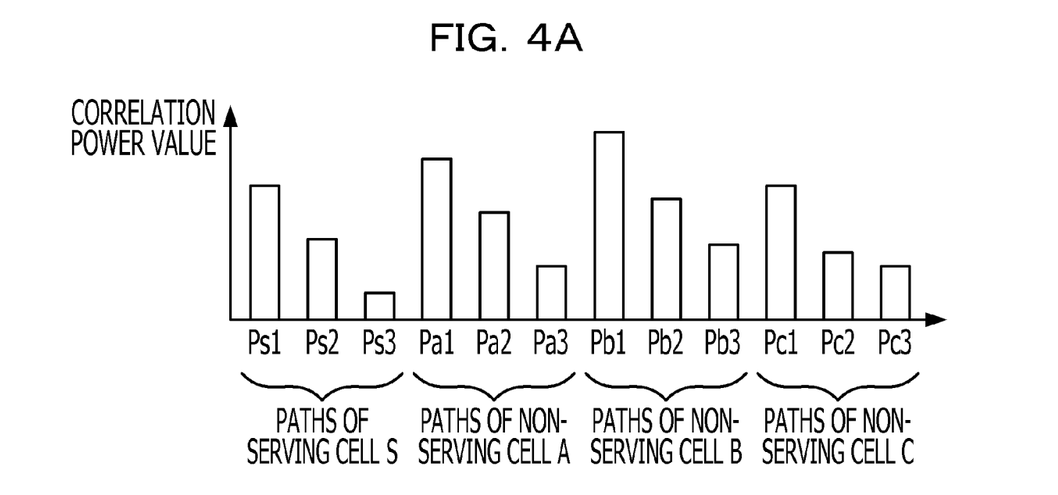
FIGS. 4A and 4B are graphs showing path search correlation power for each path referred in finger assignment performed in the mobile terminal according to the embodiment.
Figure 4B:
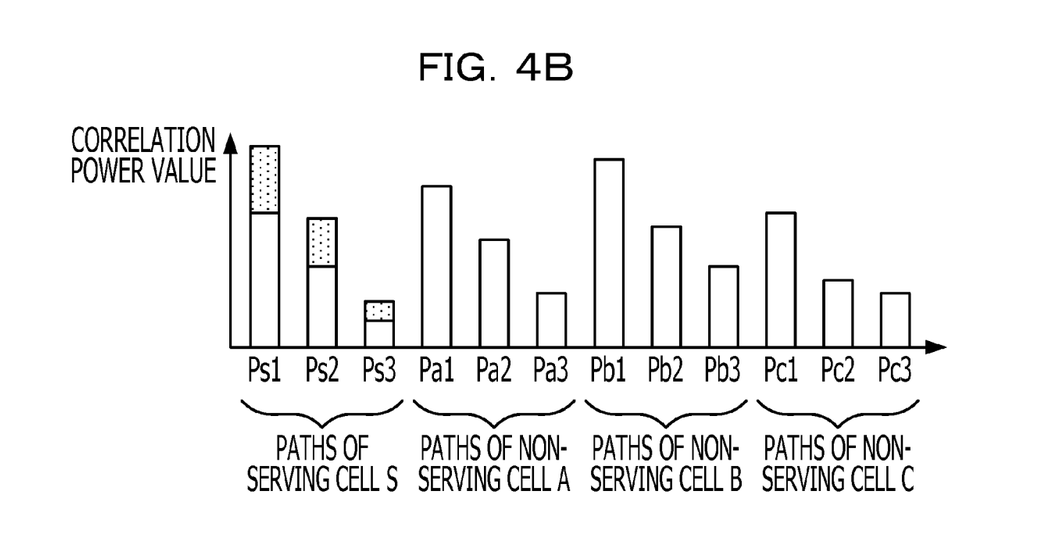

A finger assignment operation performed by the synchronization unit 104 in the mobile terminal 100 according to the embodiment will be described with reference to FIGS. 4A and 4B. FIGS. 4A and 4B are graphs showing path search correlation power of each cell for the mobile terminal 100 connected to each of the serving cell S and the non-serving cells A, B, and C. In the examples of FIGS. 4A and 4B, the mobile terminal 100 detects each of the paths Ps1, Ps2, and Ps3 of the serving cell S, the paths Pa1, Pa2, and Pa3 of the cell A the paths Pb1, Pb2, and Pb3 of the cell B, and the paths Pc1, Pc2, and Pc3 of the cell C, and receives correlation power.

In a conventional finger assignment operation, in the synchronization unit 104, notification of path information and synchronization of diffusion codes are performed so that fingers are assigned to the paths of each cell in descending order of the path search correlation power. Therefore, as shown in FIG. 4A, fingers are assigned to the paths in descending order of the path search correlation power, specifically in an order of Pb1, Pa1, Pc1, Ps1, Pb2, Pa2, Ps2, Pb3, Pc2, Pa3, Pc3, and Ps3. It is said that a preferred combined signal can be obtained after a RAKE combination by assigning fingers to paths in descending order of the path search correlation power of the paths.

However, since the number of the fingers of the mobile terminal 100 is limited, a finger may not necessarily be assigned to all the detected paths. A sufficient number of fingers may not be assigned to the paths of the serving cell S depending on the number of the fingers.

For example, in the example of FIG. 4A, when the number of the fingers in the mobile terminal 100 is 6 and the fingers are simply assigned in descending order of the correlation power, fingers are assigned to 6 paths Pb1, Pa1, Pc1, Ps1, Pb2, and Pa2 whose correlation powers are large, and for the paths of the serving cell S, a finger is assigned to only one path Ps1.

On the other hand, in the mobile terminal according to the embodiment, under the control of the control unit, the synchronization unit 104 weights the path search correlation powers of the paths of the serving cell S, and then assigns the fingers in descending order of the correlation power.

Specifically, the control unit multiplies each of the correlation powers of the paths Ps1, Ps2, and Ps3 of the serving cell S by a weighting coefficient α to calculate modified power values, and then controls an operation of the synchronization unit 104 to assign fingers in descending order of the correlation power. FIG. 4B is a graph showing the correlation powers of each path on which the weighting processing is performed. As shown in FIG. 4B, the values of the correlation powers of the paths Ps1, Ps2, and Ps3 of the serving cell S to which the weighting coefficient a is applied are greater than the values before being weighted, and the descending order of the path search correlation power is Ps1, Pb1, Pa1, Pc1, Ps2, Pb2, Pa2, Pb3, Pc2, Pa3, Pc3, and Ps3.

By performing such weighting processing, fingers can be preferentially assigned to the serving cell S which has correlation powers smaller than those of the paths of the non-serving cells. In an example in which weighting processing is performed as shown in FIG. 4B, if fingers are assigned in descending order of the path search correlation power, the fingers are assigned in an order of Ps1, Pb1, Pa1, Pc1, Ps2, Pb2, Pa2, Pb3, Pc2, Pa3, Pc3, and Ps3. Therefore, in the above-described mobile terminal that includes 6 fingers, fingers are assigned to paths Ps1, Pb1, Pa1, Pc1, Ps2, and Pb2, so that fingers can be assigned to the paths Ps1 and Ps2 among the paths of the serving cell S.

As described above, according to the operation of the control unit according to the embodiment, a limited number of finger units 110(1) to 110(n) included in the mobile terminal 100 can be preferentially assigned to the paths of the serving cell S. Therefore, the number of fingers to be assigned to the paths of the serving cell S can be somewhat greater than that of conventional finger assignment method, so that reception performance can be improved.

The weighting coefficient α is typically a positive coefficient greater than 1. The weighting coefficient a can be determined, for example, according to the number of multi paths of the serving cell S. However, if the correlation powers of the paths of the serving cell S are extremely smaller than those of the other paths, when fingers are preferentially assigned by using the weighting processing, reception quality may deteriorate against the intention. Therefore, the weighting coefficient a should be determined carefully.

(4) Example of AFC Processing Control

Figure 5A:
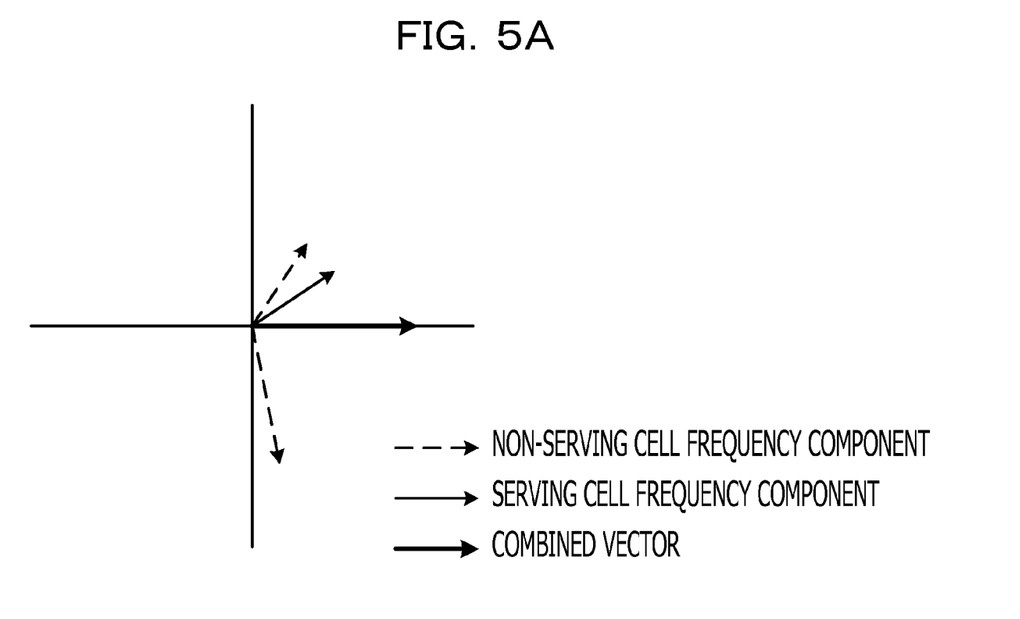
FIGS. 5A and 5B are diagrams showing an aspect of combination of phase rotation vectors in AFC processing performed in the mobile terminal according to the embodiment.
Figure 5B:
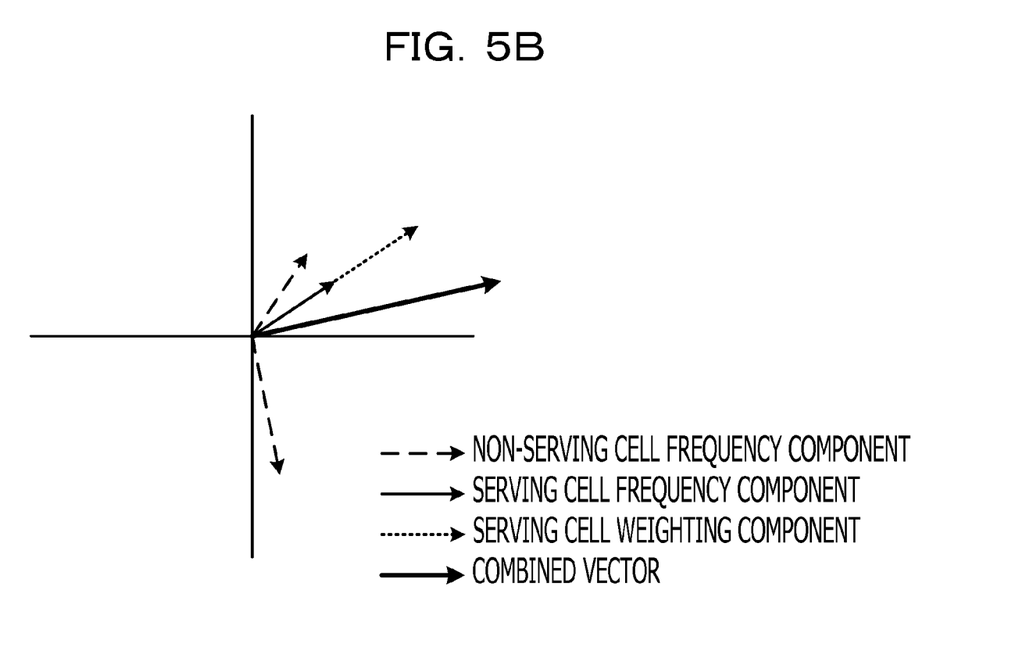

Next, a phase rotation vector combination operation for AFC processing performed by the combining unit 106 in the mobile terminal 100 according to the embodiment will be described with reference to FIGS. 5A and 5B. FIGS. 5A and 5B are diagrams showing a combination operation of phase rotation vectors of carrier wave frequencies of each of the base station S controlling the serving cell S and the base stations A and B controlling non-serving cells.

When connecting to a plurality of cells, the combining unit 106 combines phase rotation vectors of carrier wave frequencies from the base stations controlling the cells and calculates a phase rotation vector combination value. Then, the frequency controller 107 calculates a frequency control amount on the basis of the phase rotation vector combination value, and provides a control voltage for adjusting the reference frequency oscillated by the reference oscillator 103 in the mobile terminal 100. According to the so-called AFC processing described above, the reference frequency oscillated by the reference oscillator 103 is adjusted to, for example, the centroid of the carrier wave frequencies.

However, as described above, in an environment in which the mobile terminal is connected to a plurality of cells under control of a plurality of base stations, the reference frequency may not be sufficiently approximated to the carrier wave frequency of the base station controlling the serving cell S in the above-described AFC processing.

For example, as shown in FIG. 5A, when only combining the phase rotation vectors of the carrier wave frequencies of the base stations, a combined vector largely shifted from the serving cell frequency component is generated. When a frequency control amount is calculated on the basis of such a combined vector, the adjusted reference frequency will be largely shifted from the carrier wave frequency of the serving cell.

Therefore, the combining unit 106 of the mobile terminal 100 weights a vector of the serving cell frequency component by multiplying the vector, for example, by a weighting coefficient β, and then combines the vectors. The weighting coefficient β is, for example, a coefficient greater than 1. According to such processing, as shown in FIG. 5B, the combined vector can be more approximated to the serving cell frequency component compared with the case shown in FIG. 5A in which the combined vector is approximated to the centroid of the frequency components of the three base stations including the base station controlling the serving cell. Therefore, by calculating a frequency control amount on the basis of such a combined vector, it is possible to adjust the reference frequency so that the reference frequency is more approximated to the carrier wave frequency from the base station controlling the serving cell S. As a result, it is possible to suppress occurrence of problems such as decrease of CQI and deterioration of block error rate in the communication with the serving cell, and thus the throughput can be expected to improve.

The weighting coefficient β is typically a positive coefficient greater than 1. The weighting coefficient β can be determined, for example, according to a moving speed of the mobile terminal 100.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal for communicating with a plurality of cells including a first cell, the mobile terminal comprising:
   a path search unit configured to detect a path for each of the plurality of cells;
   a plurality of fingers configured to perform reverse diffusion processing on each path to be assigned and to output reception symbols;
   a finger assignment unit configured to assign the paths to the plurality of fingers;

a reference frequency adjustment unit configured to adjust a reference frequency of the mobile terminal with a frequency control amount based on the reception symbols output from the fingers; and a control unit configured to cause the reference frequency adjustment unit to adjust the reference frequency so that the reference frequency is more approximated to the reference frequency of the base station controlling the first cell compared with a case in which the reference frequency is approximated to reference frequencies of the plurality of base stations controlling the plurality of cells including the first cell, wherein the control unit causes the reference frequency adjustment unit to weight a Doppler frequency component of the base station controlling the first cell, and thereafter calculate a frequency control amount by combining the Doppler frequency component with Doppler frequency components of one or more of the plurality of base stations controlling the cells other than the first cell, and then adjust the reference frequency of the mobile terminal on the basis of the frequency control amount.

2. A communication control method for performing communication between a plurality of cells including a first cell and a mobile terminal, the communication control method being performed by the mobile terminal, the communication control method comprising:

a path search process for detecting a path for each of the plurality of cells;

a finger assignment process for assigning the paths to a plurality of fingers;

a reference frequency adjustment process for adjusting a reference frequency of the mobile terminal with a frequency control amount base on reception symbols output from the fingers; and a processing operation for, with the frequency control amount based on the reception symbols output from the fingers, adjusting the reference frequency in the reference frequency adjustment process so that the reference frequency is more approximated to the reference frequency of the base station controlling the first cell compared with a case in which the reference frequency is approximated to reference frequencies of the plurality of base stations controlling the plurality of cells including the first cell, wherein, as the processing operation, the reference frequency adjustment process weights a Doppler frequency component of the base station controlling the first cell, and thereafter calculates a frequency control amount by combining the Doppler frequency component with Doppler frequency components of one or more of the plurality of base stations controlling the cells other than the first cell, and then adjusts the reference frequency of the mobile terminal on the basis of the frequency control amount.

3. A mobile terminal for communicating with a plurality of cells including a first cell, the mobile terminal comprising:

a control unit configured to a reference frequency adjustment unit to adjust reference frequency so that the reference frequency is more approximated to reference frequency of a base station controlling the first cell compared with a case in which reference frequency is approximated to reference frequencies of a plurality of base stations controlling a plurality of cells including the first cell wherein the control unit causes the reference frequency adjustment unit to weight a Doppler frequency component of the base station controlling the first cell, and thereafter calculate a frequency control amount by combining the Doppler frequency component with Doppler frequency components of one or more of the plurality of base stations controlling the cells other than the first cell, and then adjust the reference frequency of the mobile terminal on the basis of the frequency control amount.

* * * * *